United States Patent
Kuroda et al.

(10) Patent No.: US 8,351,401 B2
(45) Date of Patent: Jan. 8, 2013

(54) CODE SEQUENCE TRANSMISSION METHOD, WIRELESS COMMUNICATION SYSTEM, TRANSMITTER, AND RECEIVER

(75) Inventors: Nahoko Kuroda, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 1275 days.

(21) Appl. No.: 11/817,035

(22) PCT Filed: Feb. 27, 2006

(86) PCT No.: PCT/JP2006/303566
§ 371 (c)(1),
(2), (4) Date: Aug. 24, 2007

(87) PCT Pub. No.: WO2006/090872
PCT Pub. Date: Aug. 31, 2006

(65) Prior Publication Data
US 2009/0034481 A1 Feb. 5, 2009

(30) Foreign Application Priority Data
Feb. 25, 2005 (JP) .................................. 2005-049908

(51) Int. Cl.
*H04B 7/216* (2006.01)
(52) U.S. Cl. ........ 370/335; 370/342; 375/134; 375/149; 375/368
(58) Field of Classification Search .................. 370/209, 370/335, 342, 509; 375/130, 134, 144, 145, 375/148, 149, 343, 368
See application file for complete search history.

(56) References Cited

U.S. PATENT DOCUMENTS

| | | | |
|---|---|---|---|
| 6,707,841 B1* | 3/2004 | Takasaki | 375/130 |
| 2002/0115464 A1* | 8/2002 | Hwang et al. | 455/522 |
| 2003/0072290 A1* | 4/2003 | Hwang et al. | 370/342 |
| 2003/0091008 A1* | 5/2003 | Miyoshi et al. | 370/335 |
| 2003/0210712 A1* | 11/2003 | Cai et al. | 370/498 |
| 2004/0015750 A1* | 1/2004 | Obuchi et al. | 714/704 |
| 2005/0031019 A1* | 2/2005 | Itoh | 375/142 |
| 2006/0193268 A1* | 8/2006 | Walton et al. | 370/264 |
| 2007/0106922 A1* | 5/2007 | Obuchi et al. | 714/704 |

(Continued)

FOREIGN PATENT DOCUMENTS
JP 61-199342 A 9/1986
(Continued)

OTHER PUBLICATIONS

TR25.808v1.0.0 (2004-12n) 3rd Generation Partnership Project: Technical Specification Group Radio Access Network; FDD Enhanced Uplink; Physical Layer Aspects (Release6), pp. 8-12.

(Continued)

*Primary Examiner* — Hassan Phillips
*Assistant Examiner* — Ajay Cattungal
(74) *Attorney, Agent, or Firm* — Sughrue Mion, PLLC

(57) ABSTRACT

A code sequence transmission method capable of improving system throughput and user throughput by improving power utilization efficiencies of a control channel and a data channel including a plurality of signals having different required qualities is provided. In a mobile station, a bit sequence of a TFCI is transmitted within one frame a plurality of times repeatedly, the bit sequence of each TFCI is multiplied by one bit of a bit sequence of an SI, a multiplication result is transmitted. It is thereby possible to transmit both the TFCI and the SI without providing a signal field of the SI in each frame.

20 Claims, 8 Drawing Sheets

U.S. PATENT DOCUMENTS

| | | | |
|---|---|---|---|
| 2008/0130608 A1* | 6/2008 | Hwang et al. | 370/342 |
| 2009/0180461 A1* | 7/2009 | Song | 370/345 |
| 2010/0296490 A1* | 11/2010 | Obuchi et al. | 370/335 |

FOREIGN PATENT DOCUMENTS

| | | |
|---|---|---|
| JP | 2-246548 A | 10/1990 |
| JP | 06-124190 A | 5/1994 |
| JP | 8-316967 A | 11/1996 |
| JP | 10-56405 A | 2/1998 |
| JP | 10-200504 A | 7/1998 |
| JP | 3302021 B2 | 4/2002 |
| JP | 2002-543662 A | 12/2002 |
| JP | 2003-229835 A | 8/2003 |
| JP | 2004-503981 A | 2/2004 |
| JP | 2004-80531 A | 3/2004 |
| WO | WO 99/26369 A1 | 5/1999 |
| WO | WO 00/65744 A1 | 11/2000 |

OTHER PUBLICATIONS

3GPP RAN WGI #38bis Meeting R1-041066, Sep. 20-25, 2004, "Uplink Control Channel Design for Enhanced Uplink", Motorola, pp. 1-6.

* cited by examiner

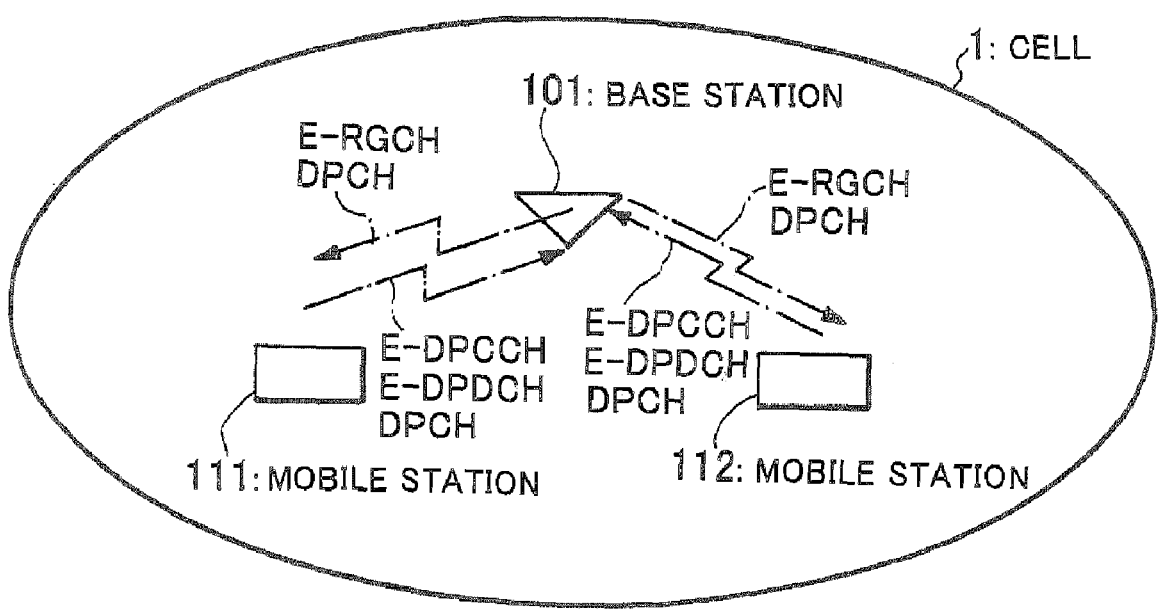

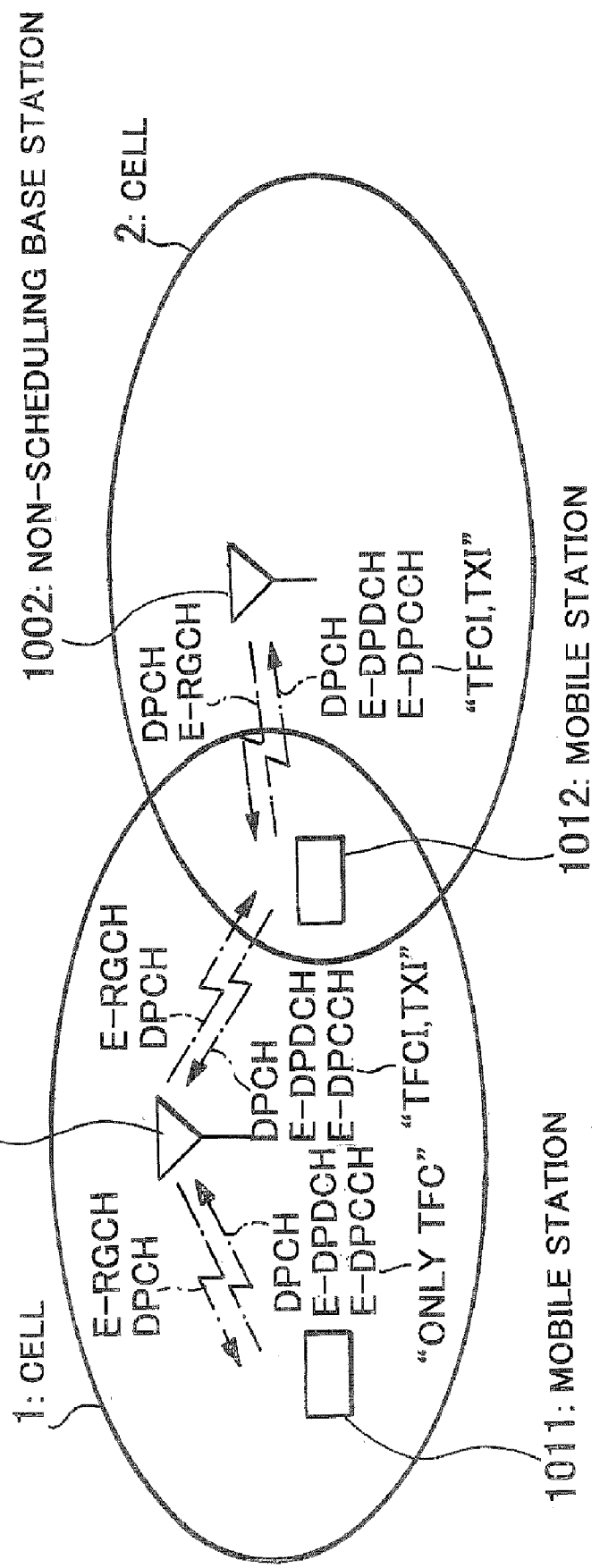

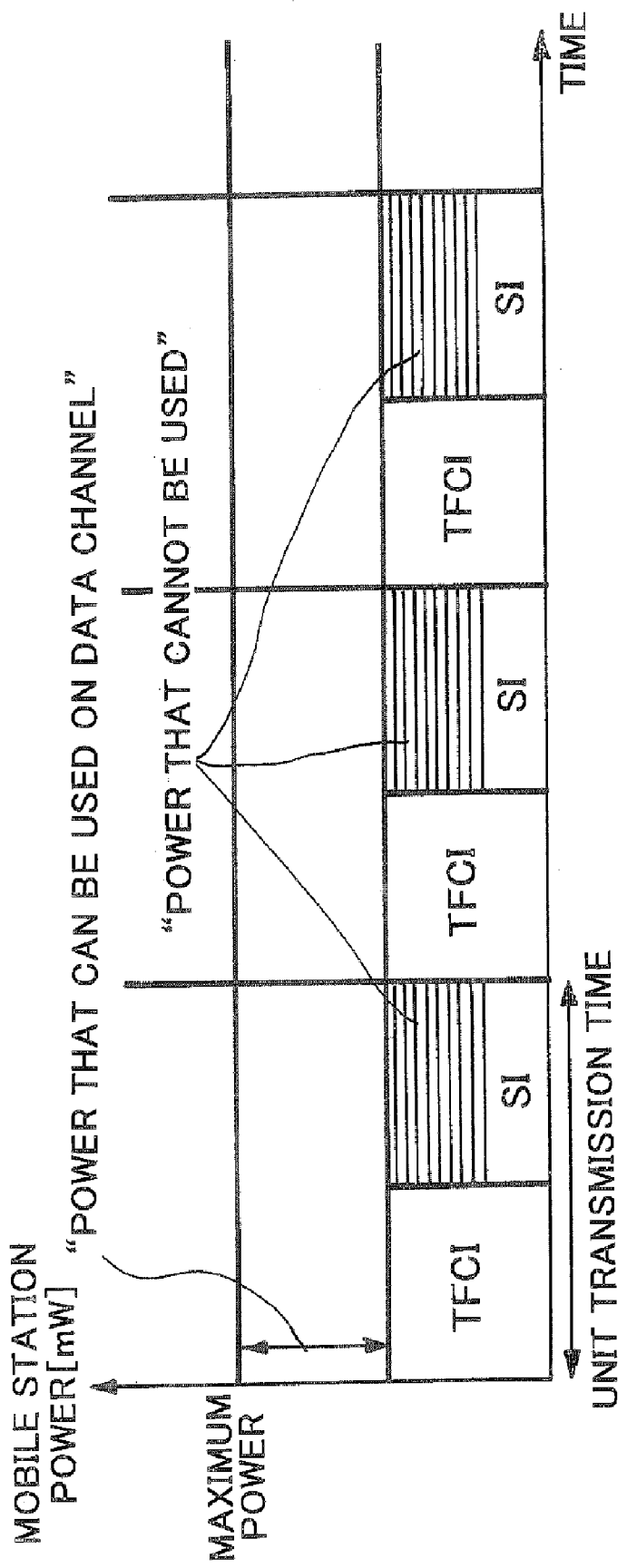

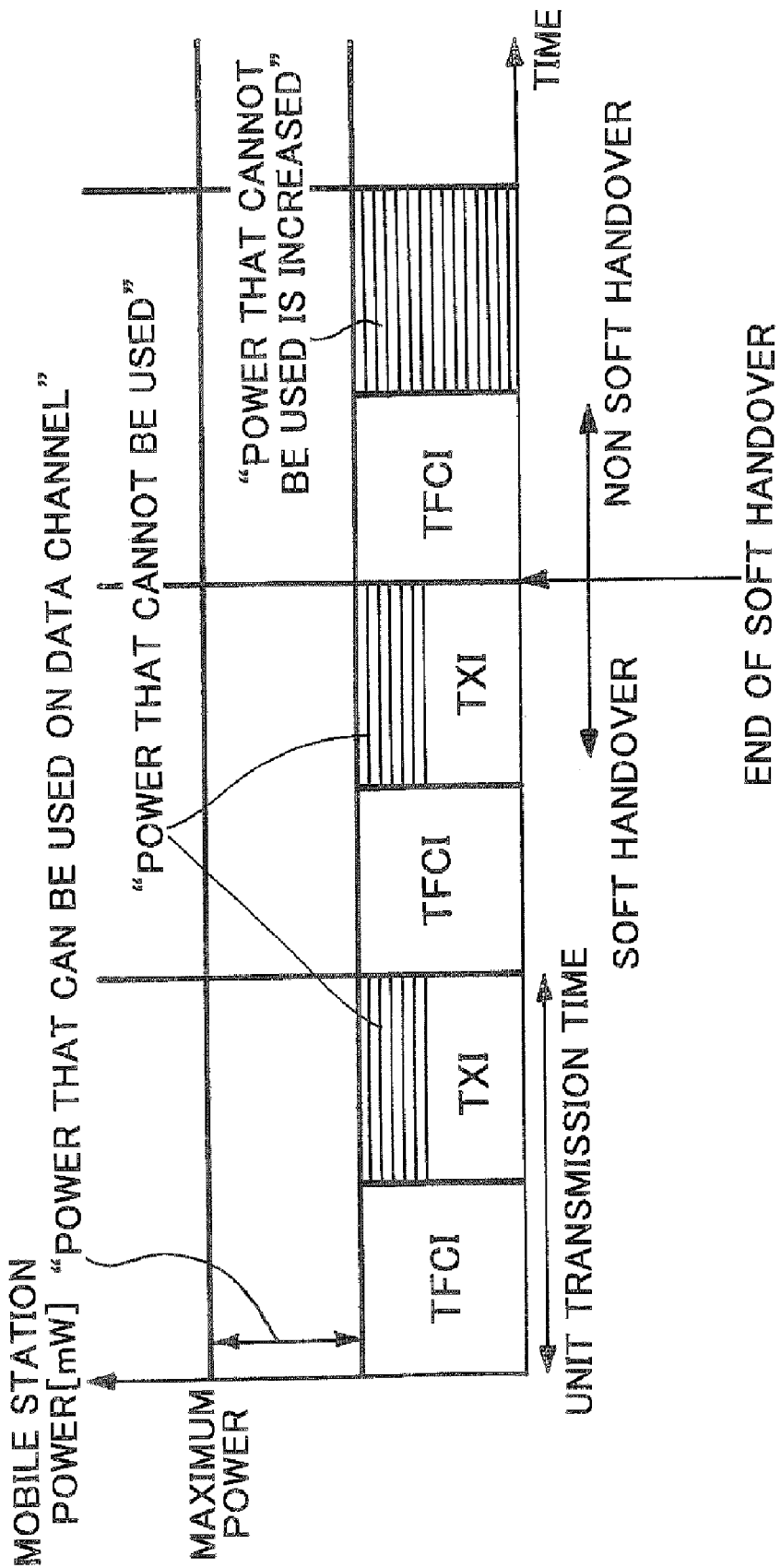

… (1) …

CODE SEQUENCE TRANSMISSION METHOD, WIRELESS COMMUNICATION SYSTEM, TRANSMITTER, AND RECEIVER

TECHNICAL FIELD

The present invention relates to a code sequence transmission method, a wireless communication system, a transmitter, and a receiver. More specifically, the present invention relates to a code sequence transmission method, a wireless communication system, a transmitter, and a receiver using an EUDCH (Enhanced Uplink Data Channel) that is a channel based on high-speed packet transmission on an uplink according to W-CDMA (Wideband-Code Division Multiple Access).

BACKGROUND ART

According to a technique using the EUDCH that is a high-speed packet transmission channel on an uplink according to the W-CDMA, data is transmitted from a mobile station by configuring a control channel and a data channel and multiplexing codes (see, for example, Non-Patent Document 1). It is, therefore, possible to configure a power on the control channel and that on the data channel independently of each other.

However, a maximum transmission power of the mobile station is limited and data decoding cannot be performed unless a control signal is accurately received. For this reason, the mobile station allocates a necessary power first to the control channel so as to transmit the control channel with a required quality. The mobile station then calculates a remaining power, decides a transmission rate at which a power is equal to or lower than the remaining power as a transmission rate on the data channel, and transmits the control channel and the data channel. Accordingly, if the power used on the control channel is lower, the power that can be used on the data channel is increased, making it possible to select a higher transmission rate.

Meanwhile, the control channel according to the EUDCH includes a plurality of pieces of control information different in required quality. If a transport format (TF) indicating information on a transmission form (e.g., a block size) of data transmitted on the data channel and a scheduling information (SI) necessary for a base station to perform scheduling are transmitted on the control channel, and the base station erroneously receives the TF, the data cannot be decoded. Due to this, an error rate required for the TF is normally set more strictly than that required for the SI.

FIG. 10 is an explanatory view of one example of a control signal transmission method according to a conventional art. As stated, on a control channel shown in FIG. 10, a transmission power in a signal field of the TF (TFCI) is configured higher than that in a signal field of the SI, and the TF is transmitted so that a power per bit of the TF is higher. By doing so, even if different required qualities are set for the respective control signals, the control signals can be transmitted on the same channel while satisfying the respective required qualities.

Moreover, transmission of a control signal (TXI: Transmission Indicator) for efficiently using hardware resources of a mobile station is considered (see, for example, Non-Patent Document 2). FIG. 11 is an explanatory view of another example of the control signal transmission method according to the conventional art. Referring to FIG. 11, the TXI is a control signal which is used only during soft handover and the transmission of the TXI is stopped in regions other than soft handover regions.

Non-Patent Document 1: TR25.808v1.0.0 (2004-12n) 3rd Generation Partnership Project: Technical Specification Group Radio Access Network; FDD Enhanced Uplink; Physical Layer Aspects (Release 6)

Non-Patent Document 2: 3GPP RAN WGI #38bis Meeting R1-041066, Sep. 20-25, 2004, "Uplink Control Channel Design for Enhanced Uplink", Motorola Patent Document 1: JP-A-2003-229835

Patent Document 2: JP-A-8-316967

DISCLOSURE OF THE INVENTION

However, the conventional art has the following problems. As already stated, according to the EUDCH, the required power on the control channel is secured and data channel is transmitted at the remaining power. The power that can be used on the data channel is updated per unit transmission time and should be kept constant within the unit transmission time. Therefore, as shown in FIG. 10, it is necessary to secure the highest required power within the unit transmission time for the control channel. As a result, if a plurality of control signals (TFCI and SI in the example of FIG. 10) different in required power are transmitted, a remainder of the power is generated while the control signal (SI) at a low required power is transmitted. However, this power cannot be used for data transmission.

Furthermore, the TXI stated above or the like is the control signal necessary only during the soft handover, and the power secured for the control channel is not at all used in a signal field of the TXI in the regions other than the soft handover regions (see FIG. 11). However, for the same reason as that stated above, this remaining power cannot be used on the data channel.

Generally, a system is designed so that the regions other than the soft handover regions occupy about 60 percent of an entire area. If it is assumed that mobile stations are uniformly distributed, the power which cannot be used is generated in 60 percent of the mobile stations. If the power that cannot be used for the data transmission is generated, then utilization efficiency for using resources of each mobile station is deteriorated, and an average transmission rate on the data channel is reduced. As a result, system throughput and user throughput are deteriorated.

As for the TXI, it may be considered to change a format of the signal field of the TXI within the unit transmission time and to provide no signal field for the TXI in the regions other than the soft handover regions. However, to change the format of the signal field, it is unfavorably necessary to take steps to do so in the base station and each of the mobile stations, and to increase the number of wireless layers and the number of control signals in the network.

It is, therefore, an object of the present invention to provide a code sequence transmission method, a wireless communication system, a transmitter, and a receiver that can solve the above-stated problems, that can improve power utilization efficiency on a control channel and a data channel including a plurality of signals having different required qualities, and that can thereby improve system throughput and user throughput.

To solve the problems, a code sequence transmission method according to the present invention is characterized by comprising steps of: causing a transmitter and a receiver to configure a first channel; deciding a first code sequence and a second code sequence transmitted by the transmitter within a unit transmission time constituted by a plurality of sub-transmission times from a set of first and second code sequences including a plurality of code sequences; causing the transmitter to calculate the first code sequence and each code of the second code sequence within each of the sub-transmission times that constitute the unit transmission time, and to transmit a calculation result; and causing the receiver to determine the first code sequence and the second code sequence received on the first channel from the set of the first and second code sequences.

Moreover, a wireless communication system according to the present invention is characterized by comprising: means for causing a transmitter and a receiver to configure a first channel; means for deciding a first code sequence and a second code sequence transmitted by the transmitter within a unit transmission time constituted by a plurality of sub-transmission times from a set of first and second code sequences including a plurality of code sequences; means for causing the transmitter to calculate the first code sequence and each code of the second code sequence within each of the sub-transmission times that constitute the unit transmission time, and to transmit a calculation result; and means for causing the receiver to determine the first code sequence and the second code sequence received on the first channel from the set of the first and second code sequences.

A transmitter according to the present invention is characterized by comprising: means for configuring, together with a receiver, a first channel; means for deciding a first code sequence and a second code sequence transmitted within a unit transmission time constituted by a plurality of sub-transmission times from a set of first and second code sequences including a plurality of code sequences; means for calculating the first code sequence and each code of the second code sequence within each of the sub-transmission times that constitute the unit transmission time, and for transmitting a calculation result.

A receiver according to the present invention is a receiver in a wireless communication system, the wireless communication system comprising: means for causing a transmitter and the receiver to set a first channel; means for deciding a first code sequence and a second code sequence transmitted by the transmitter within a unit transmission time constituted by a plurality of sub-transmission times from a set of first and second code sequences including a plurality of code sequences; and means for causing the transmitter to calculate the first code sequence and each code of the second code sequence within each of the sub-transmission times that constitute the unit transmission time, and to transmit a calculation result, the receiver characterized by comprising means for determining the first code sequence and the second code sequence received on the first channel from the set of the first and second code sequences.

According to the present invention, the transmitter calculates the first code sequence and the second code sequence and transmits the calculation result to the receiver.

EFFECT OF THE INVENTION

According to the present invention constituted as stated above, it is possible to improve the power utilization efficiency on the control channel and the data channel including a plurality of signals having different required qualities, and improve the system throughput and user throughput.

Namely, according to a first embodiment of the present invention, a bit sequence of a TFCI is transmitted repeatedly within one frame a plurality of times, a bit sequence of each TFCI is multiplied by one bit of a bit sequence of an SI, and a multiplication result is transmitted. It is thereby possible to transmit both the TFCI and the SCI without providing the signal field for the SI in the frame.

By doing so, even if the TFCI and SI differ in required quality, it is possible to satisfy the required qualities of both the TFCI and the SI and make a transmission power on each frame of an E-DPCCH (E-DCH Dedicated Physical Control channel) uniform.

Accordingly, the power utilization efficiency can be improved, the average power allocated to the E-DPDCH can be increased, and the system throughput and the user throughput can be improved.

Moreover, according to a second embodiment of the present invention, even if a control signal used only during soft handover is present, it is unnecessary to provide a signal field for the control signal. Therefore, even if the same frame format is always used, a deterioration in power utilization efficiency can be avoided and the throughput can be improved. Furthermore, since it is unnecessary to change the frame format according to whether the region is a soft handover region or the other region, procedures accompanying the change of the frame format can be reduced. In addition, control signal traffic on a wireless layer and in the network can be reduced.

BRIEF DESCRIPTION OF THE DRAWINGS

FIG. 1 is a block diagram of a wireless communication system according to a first embodiment of the present invention;

FIG. 2 is an explanatory view of bit sequences of TFs employed in the first embodiment of the present invention;

FIG. 3 is an explanatory view of bit sequences of SIs employed in the first embodiment of the present invention;

FIG. 8 is a block diagram of a wireless communication system according to a second embodiment of the present invention;

FIG. 9 is an explanatory view of bit sequences of TXIs used in the second embodiment of the present invention;

FIG. 10 is an explanatory view of one example of a control signal transmission method according to a conventional art; and FIG. 11 is an explanatory view of another example of the control signal transmission method according to the conventional art.

Figure 4:
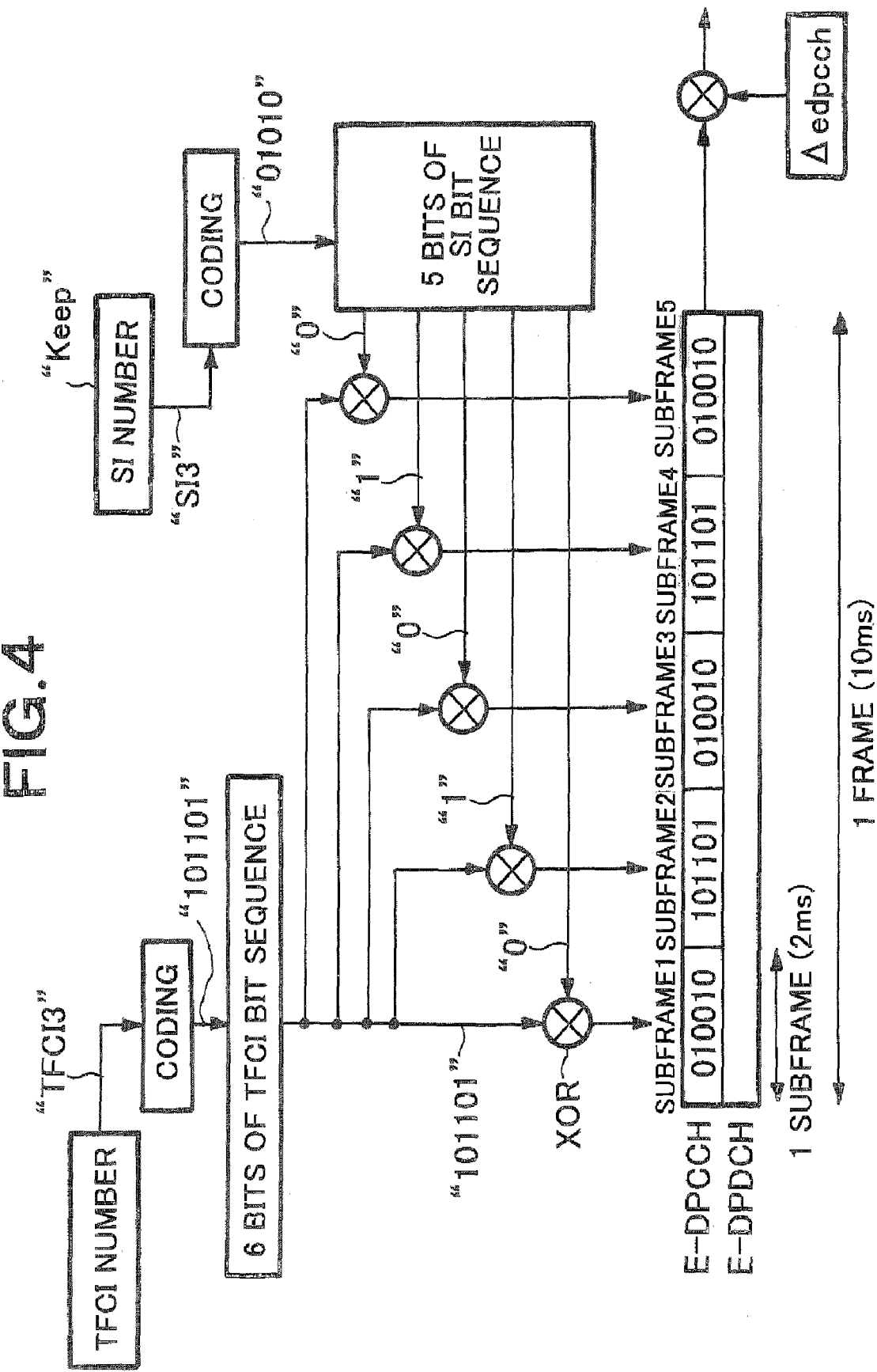
FIG. 4 is an explanatory view of one example of a method for an E-DPCCH transmission.

| DESCRIPTION OF REFERENCE NUMERALS | |
|---|---|
| 1, 2 | Cell |
| 101 | Base station |
| 111, 112 | Mobile station |
| 501 | Reception processing unit |
| 502 | Signal separating unit |
| 503 | Received signal quality measuring unit |
| 504 | TPC signal generating unit |
| 505 | Power calculating unit |

-continued

DESCRIPTION OF REFERENCE NUMERALS

| 506 | To-be-transmitted data selecting unit |
|---|---|
| 507 | Buffer |
| 508 | SI signal generating unit |
| 509 | TFCI signal generating unit |
| 510 | Signal combining unit |
| 511 | Transmission processing unit |
| 601 | Reception processing unit |
| 602 | Signal separating unit |
| 603 | Received signal quality measuring unit |
| 604 | TCP signal generating unit |
| 605 | Determining unit |
| 606 | Decoding unit |
| 607 | Scheduler |
| 608 | Transmission processing unit |
| 1001, 1002 | Base station |
| 1011, 1012 | Mobile station |

BEST MODE FOR CARRYING OUT THE INVENTION

Embodiments of the present invention will be described hereinafter with reference to the accompanying drawings. In the embodiments, an EUDCH according to W-CDMA will be described by way of example.

First Embodiment

FIG. 1 is a block diagram of a wireless communication system according to a first embodiment of the present invention. In FIG. 1, the wireless communication system according to the first embodiment of the present invention includes a base station 101 provided in a cell 1, and mobile stations 111 and 112 connected to the base station 101. The following channels are configured between this base station 101 and the respective mobile stations 111 and 112, and data is transmitted on uplink (in a direction from the mobile stations 111 and 112 to the base station 101).

Referring to FIG. 1, E-DPCCH is an uplink channel for transmitting a control signal on an EUDCH, and E-DPDCH (E-DCH Dedicated Physical Data Channel) is an uplink channel for transmitting data on the EUDCH. In addition, E-RGCH (EDCH Relative Grant Channel) is a channel on downlink (in a direction from the base station 101 to the mobile stations 111 and 112) for transmitting the control signal on the EUDCH, and DPCH (Dedicated Physical Channel) is a channel on both uplink and downlink for transmitting a transmission power control signal.

A unit transmission time (one frame) of each of these channels is, for example, 10 ms, and one frame includes, for example, 15 slots. Each of the base station 101 and the mobile stations 111 and 112 transmits a pilot signal and a transmission power control signal (TCP) in slots on the DPCH. A closed loop transmission power control is exercised so that the DPCHs on the uplink and the downlink attain predetermined target qualities, respectively.

Moreover, the base station 101 schedules the mobile station 111 or 112 that transmits data on the EUDCH in frames so that a ratio of a total reception power to a noise power ("noise rise") is equal to or lower than a predetermined target value. The base station 101 notifies each of the mobile stations 111 and 112 of a maximum transmission rate on the E-DPDCH which each of the mobile stations 111 and 112 is granted to use, on the E-RGCH.

Each of the mobile stations 111 and 112 and the base station 101 is notified, in advance, of a set of transport formats (TFs) that can be used on the E-DPDCH. Each of the mobile stations 111 and 112 selects a TF used for transmission on each frame.

FIG. 2 is an explanatory view of bit sequences of TFs employed in the first embodiment. In this embodiment, as shown in FIG. 2, the transport format set includes, for example, three types of TFs, e.g., TF1 (TFCI1) to TF3 (TFCI3). Namely, a transmission rate of the TFCI1 is 0 kbps and a bit sequence of the TFCI1 is represented by, for example, "010101". A transmission rate of the TFCI2 is 32 kbps and a bit sequence of the TFCI2 is represented by, for example, "001100". A transmission rate of the TFCI3 is 64 kbps and a bit sequence of the TFCI3 is represented by, for example, "101101".

FIG. 3 is an explanatory view of an example of bit sequences of SIs employed in the first embodiment of the present invention. In this embodiment, as shown in FIG. 3, the transport format set includes three types of SIs, e.g., SI1 to SI3. Namely, the SI1 indicates control (maximum transmission rate) UP and a bit sequence of the SI1 is represented by, for example "11111". The SI2 indicates control (maximum transmission rate) DOWN and a bit sequence of the SI2 is represented by, for example, "00000". The SI3 indicates control (maximum transmission rate) Keep and a bit sequence of the SI3 is represented by, for example, "01010".

Each of the mobile stations 111 and 112 calculates a remaining power P_remain [mW] by subtracting powers P_dpch [mW] and P_edpech [mW] required on the DPCH (UL) (uplink DPCH) and E-DPCCH, respectively from a maximum transmission power P_max [mW]. In addition, each of the mobile stations 111 and 112 selects a TF in which the required power is equal to or lower than P_remain and in which the transmission rate is the highest among TFs in which the required power is equal to or lower than P_remain and in which the transmission rate is equal to or lower than the maximum transmission rate notified by the base station 101 on the E-RGCH. At this time, the required power for the E-DPDCH is assumed to be a power obtained by multiplying the power on the DPCH by a true value of a power offset $\Delta TFx$ [dB] (where x=1, 2, 3) specified for each TF.

Each of the mobile stations 111 and 112 transmits two control signals, i.e., a TFCI and an SI on the E-DPCCH. The TFCI is assumed to be configured so that one block includes I N-bit bit sequences $Xi=(xi,1, xi,2, \ldots, xi,N,)$ (where N is a positive integer and i=1, ..., I). In addition, the SI is assumed to be configured so that one block includes J M-bit bit sequences $Yj=(yj,1, yj,2, \ldots, yj,M,)$ (where M is a positive integer and j=1, ... J). In this embodiment, as shown in FIGS. 2 and 3, N, I, M, and J are set to, for example, N=6, I=3, M=5, and J=3.

The TFCI is a signal for notifying the base station 101 of the TF used on the E-DPDCH and selected by each of the mobile stations 111 and 112. The SI is a signal for causing each of the mobile stations 111 and 112 to request the maximum transmission rate to be increased or reduced. The SI is decided under the following conditions based on a data amount D, a present maximum transmission rate Rmax, and a target transmission delay range from $T-\Delta T$ to $T+\Delta T$ that are stored in a buffer.

(1) At $D/Rmax<T-\Delta T$, the SI indicates Down (request to reduce the maximum transmission rate); (2) At $T-\Delta T<D/Rmax<T+\Delta T$, the SI indicates Keep (request to keep the present maximum transmission rate); and (3) At $T+\Delta T<D/Rmax$, the SI indicates Up (request to increase the maximum transmission rate).

Each of the mobile stations 111 and 112 requests the maximum transmission rate to be changed so as to be able to transmit data within the target delay range using the above-decided SI signal.

It is assumed that a required power on the E-DPCCH is a power obtained by multiplying the power P_dpch [mW] on the DPCH by a true value of a power offset Δedpcch [dB]. The value of the power offset Δepdcch is decided according to whether one of or both the SI and the TFCI are transmitted. If the mobile station 111 or 112 does not transmit the TFCI, a power offset Δedpcch1 is used. If the mobile station 111 or 112 transmits the TFCI, a power offset Δedpcch2 is used. The relationship between the values of power offset is Δedpcch1<Δedpcch2. This is because an error rate requested for the TFCI is stricter than that for the SI. To transmit the TFCI, the power offset is configured higher than that for transmitting the SI, thereby satisfying the error rate requested for the TFCI. Conversely, if the TFCI is not transmitted, the required power on the E-DPCCH can be configured low.

FIG. 4 is an explanatory view of one example of a method for the E-DPCCH transmission. By way of example, a frame of the E-DPCCH is divided into five subframes, the TFCI is transmitted once per subframe, and five TFCIs are transmitted per frame. On the other hand, the SI is transmitted one bit by one bit per subframe, and one SI is transmitted per frame. If so, an exclusive OR (XOR) is performed between each of six bits of the TFCI and one bit of the SI.

Namely, the bit sequence of each TFCI transmitted repeatedly are masked by the bit sequence of the SI, thereby transmitting information on both the TFCI and the SI on one frame. It is, therefore, unnecessary to provide a field for transmitting information bits of the SI in a frame, and the power can be uniformly set in each frame. Due to is, the power utilization efficiency can be improved without non-uniformity of the power in the frame resulting from the difference in required power between the TFCI and the SI as described in the "Best Mode for Carrying out the Invention" Part. Therefore, it is possible to increase the power that can be used on the E-DPDCH and improve the throughput.

The method for the E-DPCCH transmission will be described specifically, assuming that the bit sequence of the TFCI is $Xi=(xi,1, xi,2, \ldots, xi,6,)$ (where i=1, 2, 3 and i indicates a TFCI number) and that the bit sequence of the SI is $Yi=(yj,1, yj,2, \ldots, yj,6,)$ (where j=1, 2, 3 and j indicates an SI number).

For instance, if the mobile station decides that a TFCI3 (where i=3) and an SI3 (where j=3) are bit sequences to be transmitted, a bit sequence $Z3,3=(x3,1 \cdot y3,m, x3,2 \cdot y3,m, \ldots, x3,6 \cdot y3,m)$ obtained by multiplying each bit of $X3=(x3,1, x3,2, \ldots, x3,6)$ by an m-th bit y3,m of Y3 on an m-th frame of the E-DPCCH. The mobile station transmits these bit sequences over five frames for m=1 to 5.

Figure 5:
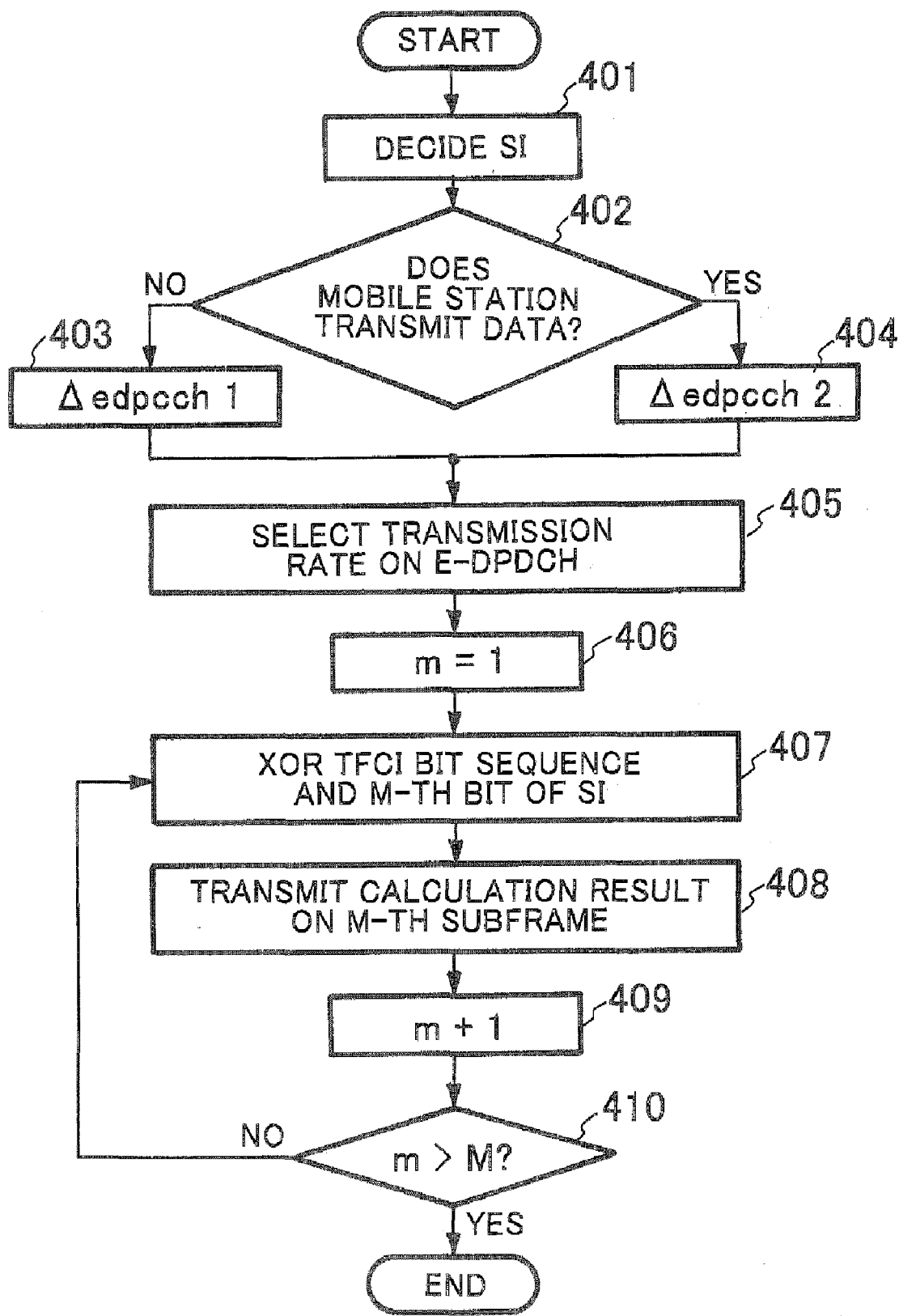
FIG. 5 is a flowchart of an operation related to the E-DPCCH transmission on a mobile station employed in the first embodiment of the present invention.

FIG. 5 is a flowchart of an operation related to the E-DPCCH transmission on the mobile station employed in the first embodiment of the present invention. Each of the mobile stations 111 and 112 decides which request signal SI among the SI1(UP), the SI2(Down), and the SI3(Keep) is used to request the transmission rate to be increased or reduced based on the data amount in the buffer and the present maximum transmission rate (step 401).

If no data is present in the buffer or the maximum transmission rate is zero, the mobile station 111 or 112 does not transmit data (step 402, No). Accordingly, the power offset on the E-DPCCH is configured to the Δedpcch1 (step 403). Otherwise, the mobile station 111 or 112 transmits data (step 402, Yes), and the power offset on the E-DPCCH is configured to the Δedpcch2 (step 404).

Thereafter, the mobile station 111 or 112 selects a TF used to transmit the data from among TFs in which the power is equal to or lower than the power that can be used on the E-DPDCH and in which the transmission rate is equal to or lower than the maximum transmission rate (step 405), and sets the subframe number m to 1 (m=1) (step 406). In addition, the mobile station 111 or 112 performs an exclusive OR (XOR) on the bit sequence of the TFCI indicating the selected TF and the m-th bit of the bit sequence of the SI (step 407), and transmits a calculation result to the base station 101 on the m-th subframe of the E-DPCCH (step 408)

Subsequently, the number m is compared with the number M of subframes per frame (where M=5 in this embodiment). If the m is equal to or smaller than the M (step 410, No), then the processing returns to the step 407, and the calculation XOR is repeatedly executed until the m becomes greater than the M. When the m becomes greater than the M (step 410, Yes), the mobile station 111 or 112 finishes transmitting the data corresponding to one frame of the E-DPCCH.

Figure 6:
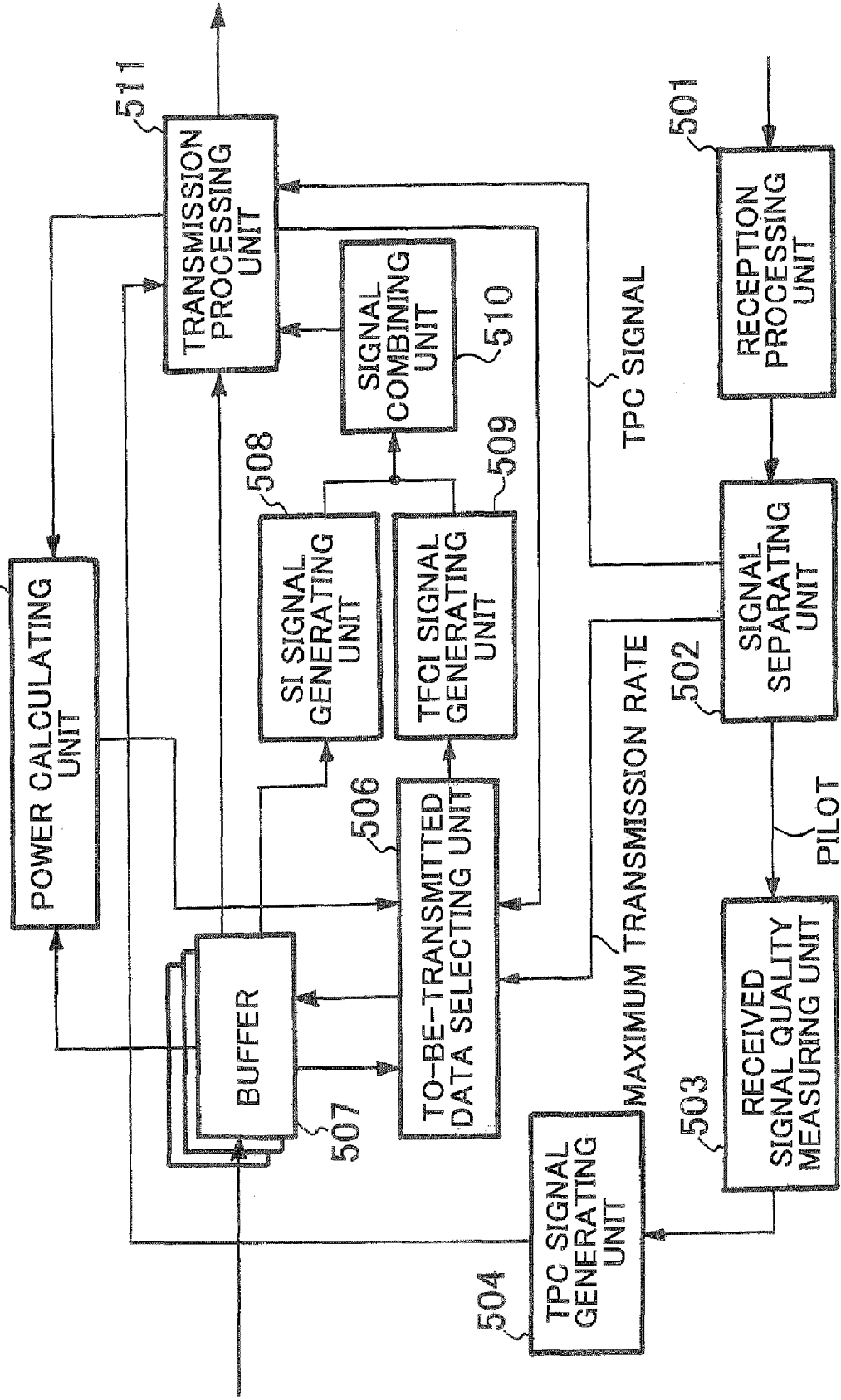
FIG. 6 is a block diagram of one example of the mobile station employed in the first embodiment of the present invention.

FIG. 6 is a block diagram of one example of the mobile station employed in the first embodiment of the present invention. The mobile station 111 or 112 according to the present invention includes a reception processing unit 501, a signal separating unit 502, a received signal quality measuring unit 503, a TPC signal generating unit 504, a power calculating unit 505, a to-be-transmitted data selecting unit 506, a buffer 507, an SI signal generating unit 508, a TFCI signal generating unit 509, a signal combining unit 510, and a transmission processing unit 511. The reception processing unit 501 performs a reception processing such as despreading on a signal. The signal separating unit 502 separates the signal received by the reception processing unit 501 into a TPC signal, a maximum transmission rate signal, and a pilot signal. The received signal quality measuring unit 503 measures a received signal quality of the pilot signal obtained by separating the received signal. The TPC signal generating unit 504 generates a transmission power control signal from the received signal quality of the pilot signal. The power calculating unit 505 calculates a power on the E-DPDCH. The to-be-transmitted data selecting unit 506 selects to-be-transmitted data. The buffer 507 stores data on the E-DPDCH. The SI signal generating unit 508 generates the SI signal. The TFCI signal generating unit 509 generates the TPCI signal. The signal combining unit 510 combines the SI signal with the TFCI signal. The transmission processing unit 511 performs a transmission processing on the combined signal.

The power calculating unit 505 decides powers used on the DPCH and E-DPCCH, respectively based on information from the transmission processing unit 511 and on whether or not data is present in the buffer 507. In addition, the power calculating unit 505 notifies the to-be-transmitted data selecting unit 506 of a power obtained by subtracting the powers used on the DPCH and that used on the E-DPCCH from the maximum power as the power than can be used on the E-DPDCH.

The to-be-transmitted data selecting unit 506 selects a TF in which the power is equal to or lower than the power that can be used on the E-DPDCH and the transmission rate is the highest among the TFs in which the transmission rates are equal to or lower than the maximum transmission rate notified by the base station 101, and notifies the buffer 507 of the selected TF. The buffer 507 transmits a data block at a block size specified by the notified TF to the transmission processing unit 511.

Moreover, the selected TF is transmitted to the TFCI signal generating unit 5099 and a bit sequence corresponding to the selected TF is transmitted to the signal combining unit 510.

Information on the data amount in the buffer 507 and the maximum transmission rate is transmitted to the SI signal generating unit 508. The SI signal generating unit 508 decides the SI for requesting the transmission rate to be increased or reduced, and transmits a corresponding bit sequence to the signal combining unit 510.

The signal generating unit 510 transmits five bit sequences obtained by performing exclusive ORs on the six bits of the TFCI and each bit of the SI to the transmission processing unit 511. The transmission processing unit 511 transmits one bit sequence per subframe.

Figure 7:
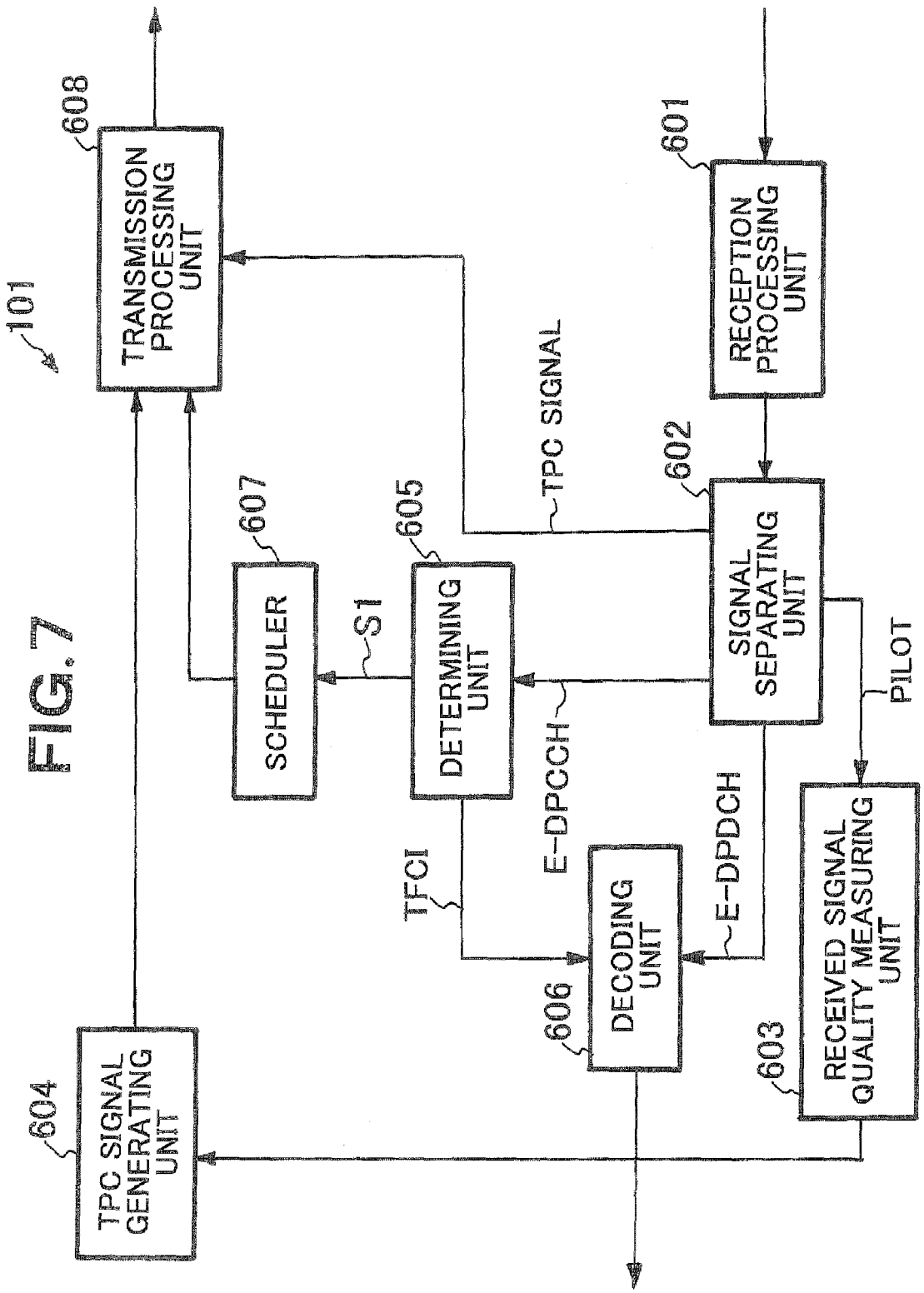
FIG. 7 is a block diagram of one example of the base station employed in the first embodiment of the present invention.

FIG. 7 is a block diagram of one example of the base station employed in the first embodiment of the present invention. The base station 101 according to the present invention includes a reception processing unit 601, a signal separating unit 602, a received signal quality measuring unit 603, a TPC signal generating unit 604, a determining unit 605, a decoding unit 606, a scheduler 607, and a transmission processing unit 608. The reception processing unit 601 performs a reception processing such as channel estimation and despreading on a signal. The signal separating unit 602 separates the signal received by the reception processing unit 601 into an E-DPCCH signal, an E-DPDCH signal, and a pilot signal. The received signal quality measuring unit 603 measures a received signal quality of the pilot signal obtained by dividing the received signal. The TCP signal generating unit 604 generates a transmission power control signal based on the received signal quality of the pilot signal. The determining unit 605 determines the E-DPCCH signal. The decoding unit 606 decodes E-DPDCH data. The scheduler 607 schedules the mobile station 111 or 112 for causing the mobile station 111 or 112 to transmit data on the E-DPDCH. The transmission processing unit 608 performs a spreading processing and the like on the signal.

The determining unit 605 determines a combination of the TFCI and the SI received as a signal R=(r1, r2, . . . , r30) received on the E-DPCCH based on the received signal R, a bit sequence set Xi=(xi, 1, xi, 2, . . . , xi, 6) (where i=1, 2, and 3, and i indicates a TFCI number) of the TFCIs and a bit sequence set Yj=(yj, 1, yj, 2, . . . , yj, 5) (where j=1, 2, 3, and j indicates an SI number) of the SIs. If a channel estimated value transmitted from the reception processing unit 601 is assumed as h, the determining unit 605 calculates a distance Zij between each bit sequence and the received signal relative to the combination of the TFCI number i and the SI number j as represented by the following equation.

The determining unit 605 calculates distances Zij relative to all combinations of the i and the j, respectively, as shown below, and determines the TFCI and the SI corresponding to the combination that indicates the smallest distance as the TFCI and the SI received as the received signal R.

$$Z_{i,j} = \sum_{m=1}^{5}\sum_{n=1}^{6} (r_{(m-1)=6+n} - h \cdot x_{i,n} \cdot y_{j,m})^2$$

Information on the TFCI thus determined is transmitted to the decoding unit 606. The decoding unit 606 decodes the received signal on the E-DPDCH at the block size specified for the TFCI. In addition, information on the SI determined by the determining unit 605 is transmitted to the scheduler 607. The scheduler 607 schedules the mobile stations 111 and 112 based on the SI transmitted from the mobile stations 111 and 112, decides the maximum transmission rate, and transmits the decided maximum transmission rate to the transmission processing unit 608.

In this manner, according to the first embodiment, the bit sequence of the TFC is repeatedly transmitted on each frame a plurality of times, the bit sequence of each TFCI is multiplied by one bit of the bit sequence of the SI, and the resultant bit sequence is transmitted. It is thereby possible to transmit both the TFCI and the SI without providing the signal field for the SI in each frame.

By so configuring, even if the TFCI and the SI differ in required quality, it is possible to satisfy the required qualities of both the TFCI and the SI and make the transmission power on each frame of the E-DPCCH uniform. Therefore, the power utilization efficiency can be improved, the average power allocated to the E-DPDCH can be increased, and the system throughput and the user throughput can be improved.

Second Embodiment

FIG. 8 is a block diagram of a wireless communication system according to a second embodiment of the present invention. Referring to FIG. 8, the wireless communication system according to the second embodiment of the present invention includes a base station 1001 provided in the cell 1, mobile stations 1011 and 1012 connected to the base station 1001, a base station 1002 provided in a cell 2, and the mobile stations 1012 connected to the base station 1002. Namely, the mobile station 1012 present near a boundary between the cells 1 and 2 establish radio links to the two base stations 1001 and 1002, respectively. Only the base station 1001 out of the base stations 1001 and 1002 (Active Set base stations, "AS base stations") for which the respective radio links are established performs scheduling, and the other AS base station 1002 does not perform scheduling. Since channels set among the base stations 1001 and 1002 and the mobile stations 1011 and 1012 are the same as those according to the first embodiment, they will not be described herein.

The mobile stations 1011 and 1012 according to the second embodiment differ from the mobile stations 111 and 112 according to the first embodiment in the following respects. If the mobile station (e.g., the mobile station 1012) according to the second embodiment establish the radio links to the base stations 1001 and 1002, respectively, the base station transmits not only the TFCI but also a control signal TXI (transmission index) on the E-DPCCH. Neither the mobile station 1011 nor 1012 according to the second embodiment transmit the SI which the mobile stations 111 and 112 according to the second embodiment transmit.

FIG. 9 is an explanatory view of bit sequences of TXIs employed in the second embodiment of the present invention. The TXI is a signal for notifying the base station whether to transmit data on a next frame of the E-DPDCH, and each uses the bit sequences shown in FIG. 9. That is, a TXI1 indicates that data is transmitted and the bit sequence of the TXI1 is represented by, for example, "11111". A TX2 indicates that no data is transmitted and the bit sequence of the TXI2 is represented by, for example, "00000".

If each As base station receives the TXI and determines that data is transmitted on the next frame, the AS base station allocates a despreader to this mobile station. If the AS base station determines that no data is transmitted from the mobile station on the next frame, the AS base station does not allocate the despreader to the mobile station. By doing so, even the base station (which is the base station 1002 according to this embodiment) that does not perform scheduling, i.e., the base station that cannot transmit a command to permit or prohibit the mobile station to transmit or receive data can allocate the despreader only to the mobile station that transmits data. In addition, a hardware scale of the base station relative to a required received signal capacity can be reduced.

Each mobile station according to the second embodiment calculates a bit sequence of the TFCI using not the SI signal but the TXI signal, and transmits the TFCI and the TXI on the E-DPCCH.

The second embodiment exhibits the following effects besides those described in the first embodiment.

Namely, the TXI is the control signal transmitted only if each mobile station establish the radio links to the respective base stations. By using this TXI, it is unnecessary to provide the signal field for the TXI. Accordingly, even if the frame format is the same between the instance in which each mobile station establishes the rank links to the respective base stations and the instance in which each mobile station does not establish the radio links to the respective base stations, it is possible to prevent deterioration in power utilization efficiency, and improve the throughput. Besides, it is unnecessary to change the format according to whether or not the soft handover is performed. It is, therefore, possible to eliminate procedures accompanying the change of the frame format, and reduce an amount of the control signal on the wireless layer and in the network.

INDUSTRIAL APPLICABILITY

The present invention can be applied to the communication system in which each mobile station is replaced with a transmitter and each base station is replaced with a receiver, particularly to the communication system other than a cellular system. Furthermore, the present invention can be applied to not only the control over the uplink but also a control over the downlink.

The invention claimed is:

1. A code sequence transmission method comprising steps of:
   causing a transmitter and a receiver to set a first channel;
   deciding a first code sequence and a second code sequence transmitted by the transmitter within a unit transmission time constituted by a plurality of sub-transmission times from a set of first and second code sequences including a plurality of code sequences;
   causing the transmitter to perform a calculation by combining whole codes of the first code sequence and each code of the second code sequence within each of the sub-transmission times that constitute the unit transmission time, and to transmit a calculation result, which is a result of said calculation and is determined by combination of the first code sequence and the second code sequence; and
   causing the receiver to determine the first code sequence and the second code sequence received on the first channel from the set of the first and second code sequences.

2. The code sequence transmission method according to claim 1, wherein
   said calculation is made in i-th sub-transmission time using each bits included in the first code sequence and i-th bits included in the second code sequence, wherein i is an integer between one and I, wherein I is a number of bits included in the second code sequence.

3. The code sequence transmission method according to claim 1, wherein
   said calculation using the first code sequence and the second code sequence is an exclusive OR.

4. The code sequence transmission method according to claim 1, wherein
   a transmission power on the first channel is decided according to transmission of the first code sequence or the second code sequence.

5. The code sequence transmission method according to claim 1, wherein
   the first code sequence differs from the second code sequence in required quality.

6. The code sequence transmission method according to claim 1, wherein
   a transmission power that can be used on a second channel on which the transmitter transmits data is decided according to a transmission power on the first channel.

7. The code sequence transmission method according to claim 1, wherein
   in a wireless communication system for transmitting the first code sequence according to transmission of a third channel on which the transmitter transmits th data,
   the receiver determines the first code sequence and the second code sequence according to a reception power on the third channel.

8. The code sequence transmission method according to claim 6, wherein
   the second channel is equal to the third channel.

9. The code sequence transmission method according to claim 1, wherein
   in a wireless communication system that can set a plurality of transmission modes, transmission of the second code sequence is started according to a switchover among the transmission modes.

10. The code sequence transmission method according to claim 9, wherein
    the transmission modes are decided according to number of receivers that receive the data on the first channel transmitted by the transmitter.

11. The code sequence transmission method according to claim 9, wherein
    the transmission modes are decided according to number of transmitters that transmit the data on the first channel received by the receiver.

12. A wireless communication system comprising:
    means for causing a transmitter and a receiver to set a first channel;
    means for deciding a first code sequence and a second code sequence transmitted by the transmitter within a unit transmission time constituted by a plurality of sub-transmission times from a set of first and second code sequences including a plurality of code sequences;
    means for causing the transmitter to perform a calculation by combining whole codes of the first code sequence and each code of the second code sequence within each of the sub-transmission times that constitute the unit transmission time, and to transmit a calculation result, which is a result of said calculation and is determined by combination of the first code sequence and the second code sequence; and
    means for causing the receiver to determine the first code sequence and the second code sequence received on the first channel from the set of the first and second code sequences.

13. The wireless communication system according to claim 12, wherein
    said calculation is made in i-th sub-transmission time using each bits included in the first code sequence and i-th bits included in the second code sequence, wherein i is an integer between one and I, wherein I is a number of bits included in the second code sequence.

14. The wireless communication system according to claim 12, wherein
said calculation using the first code sequence and the second code sequence is an exclusive OR.

15. A transmitter comprising:
means for setting, together with a receiver, a first channel;
means for deciding a first code sequence and a second code sequence transmitted within a unit transmission time constituted by a plurality of sub-transmission times from a set of first and second code sequences including a plurality of code sequences;
means for performing a calculation by combining whole codes of the first code sequence and each code of the second code sequence within each of the sub-transmission times that constitute the unit transmission time, and for transmitting a calculation result, which is a result of said calculation and is determined by combination of the first code sequence and the second code sequence.

16. The transmitter according to claim 15, wherein
said calculation is made in i-th sub-transmission time using each bits included in the first code sequence and i-th bits included in the second code sequence, wherein i is an integer between one and I, wherein I is a number of bits included in the second code sequence.

17. The transmitter according to claim 15, wherein
said calculation using the first code sequence and the second code sequence is an exclusive OR.

18. A receiver in a wireless communication system, the wireless communication system comprising:
means for causing a transmitter and the receiver to set a first channel;
means for deciding a first code sequence and a second code sequence transmitted by the transmitter within a unit transmission time constituted by a plurality of sub-transmission times from a set of first and second code sequences including a plurality of code sequences; and
means for causing the transmitter to perform a calculation by combining whole codes of the first code sequence and each code of the second code sequence within each of the sub-transmission times that constitute the unit transmission time, and to transmit a calculation result, of said calculation, which is determined by combination of the first code sequence and the second code sequence, the receiver comprising:
means for determining the first code sequence and the second code sequence received on the first channel from the set of the first and second code sequences.

19. The receiver according to claim 18, wherein
said calculation is made in i-th sub-transmission time using each bits included in the first code sequence and i-th bits included in the second code sequence, wherein i is an integer between one and I, wherein I is a number of bits included in the second code sequence.

20. The receiver according to claim 18, wherein
said calculation using the first code sequence and the second code sequence is an exclusive OR.

* * * * *